(12) United States Patent
Savolainen

(10) Patent No.: US 12,743,421 B2
(45) Date of Patent: Sep. 22, 2026

(54) METHOD, A SYSTEM AND A COMPUTER PROGRAM PRODUCT FOR PREDICTING DATABASE QUERY PERFORMANCE

(71) Applicant: DB PRO OY, Helsinki (FI)

(72) Inventor: Jani K. Savolainen, Helsinki (FI)

(73) Assignee: DB PRO OY, Helsinki (FI)

( * ) Notice: Subject to any disclaimer, the term of this patent is extended or adjusted under 35 U.S.C. 154(b) by 439 days.

(21) Appl. No.: 17/697,998

(22) Filed: Mar. 18, 2022

(65) Prior Publication Data

US 2022/0309064 A1 Sep. 29, 2022

(30) Foreign Application Priority Data

Mar. 24, 2021 (FI) ..................................... 20215332

(51) Int. Cl.
*G06F 16/2453* (2019.01)
*G06F 11/34* (2006.01)
*G06F 16/21* (2019.01)

(52) U.S. Cl.
CPC .... *G06F 16/24542* (2019.01); *G06F 11/3419* (2013.01); *G06F 16/21* (2019.01)

(58) Field of Classification Search
CPC . G06F 16/24542; G06F 16/21; G06F 11/3419
See application file for complete search history.

(56) References Cited

U.S. PATENT DOCUMENTS 8,015,454 B1 9/2011 Harrison et al.
10,305,758 B1 * 5/2019 Bhide .................. G06F 11/328
2007/0050328 A1 * 3/2007 Li ........................ G06F 16/9032
2011/0258281 A1 * 10/2011 Archer ................ G06F 11/3404 709/212
2011/0295833 A1 * 12/2011 Narasayya .......... G06F 11/3676 707/E17.017
2013/0166486 A1 6/2013 Kim
2018/0157978 A1 6/2018 Buda et al.
2018/0218057 A1 * 8/2018 Beckham ............ A01K 29/005
2018/0314616 A1 11/2018 Savolainen (Continued)

OTHER PUBLICATIONS

Finnish Search Report issued by the Finnish Patent and Registration Office in relation to Finnish Application No. 20215332 dated Nov. 5, 2021 (1 page).

(Continued)

*Primary Examiner* — Amy Ng
*Assistant Examiner* — Dustin D Eyers
(74) *Attorney, Agent, or Firm* — Robert P. Michal, Esq.; Rimon PC

(57) ABSTRACT

A method for predicting future performance of a database query plan includes performing a plurality of time series analyses for time series associated with a plurality of selected database queries and a selected query, wherein each analyzed time series is generated based on stored query performance counter (QPC) data, and wherein the plurality of time series represents a plurality of different time dimensions, and wherein each time series analysis is performed by forming a time series corresponding to the selected time dimensions and covering the time span, wherein the time series includes data points representing a portion of stored QPC data that is associated with the selected database query and the selected QPC.

20 Claims, 4 Drawing Sheets

(56) References Cited

U.S. PATENT DOCUMENTS

| | | | | |
|---|---|---|---|---|
| 2018/0340284 | A1* | 11/2018 | Quinn | D06F 33/40 |
| 2019/0026761 | A1* | 1/2019 | Jain | G06F 16/2465 |
| 2019/0095478 | A1* | 3/2019 | Tankersley | G06F 11/3006 |
| 2020/0356462 | A1 | 11/2020 | Anand et al. | |
| 2021/0117292 | A1* | 4/2021 | Wang | G06F 11/2094 |
| 2021/0134407 | A1* | 5/2021 | Vera-Ciro | G16H 50/20 |

OTHER PUBLICATIONS

Extended European Search Report issued by the European Patent Office in relation to European Application No. 22162468.7 issued Aug. 25, 2022 (9 pages).

* cited by examiner

METHOD, A SYSTEM AND A COMPUTER PROGRAM PRODUCT FOR PREDICTING DATABASE QUERY PERFORMANCE

CROSS-REFERENCE TO RELATED APPLICATIONS

This application claims priority to Finnish Patent Application No. 20215332, filed Mar. 24, 2021, the disclosure of this application is expressly incorporated herein by reference in its entirety.

FIELD

The present invention relates to a method, a system and a computer program product related to predicting database query performance in a computer system. More particularly, the present invention relates to finding hidden anomalies and trends in the various aspects of database query performance statistics and especially to a system, method and computer program product for predicting query performance of databases or database instances inside the Database Management System (DBMS) and triggering an alert if the predicted query performance indicates potential problems.

BACKGROUND

A database management system (DBMS) is a software package designed to define, manipulate, retrieve and manage data in a database. A DBMS manipulates the data itself, data format, field names, record structure and file structure. It also defines rules to validate and manipulate this data.

Databases in a DBMS are queried using programming languages, of which best known is Structured Query Language (SQL). Queries can be divided to data manipulation operations or data query operations. Data manipulation operations change the structure of a database or the content of the actual data in the database and data query operations return data stored in the database. Databases typically comprise hundreds, thousands or even more different kinds of queries. Each query may have one or more execution plans, referred to herein as query plans, which tells how the query is/was being executed at given point of time. Also, statistics are collected for each query, such as query execution time, worker time (processor usage in milliseconds), rows returned, physical and logical reads and writes.

The problem in executing the database queries is that often they are written in a non-optimal way, so that it takes a lot of time and hardware resources to process the query. This is because not only the database table schemas are often complex and non-optimal but also the queries can be written in various ways that affect the query performance. For query optimization, there are lots of known techniques such as database table indexing, query tuning with better logical joins, conditions, query hints etc., which help for minimize the usage of time and hardware resources by the queries.

Another problem is that query plans may change over time and query performance may change over time for various reasons, such as DBMS version upgrade, database table schema change, database column datatype change, index change, query locking option change, query logic change and/or changes in which queries are run in parallel and which queries are using the same logical resources at the same time, which may lead to a lock, a block or even a deadlock of a resource and/or the query. That's why sometimes queries use more time and resources than at another point of time. Complex environment and dependencies make it often hard to find a root cause of the query time or resource bottleneck and/or to predict future problems in query execution inside the DBMS. All this could lead into slow DBMS system response, DBMS failures, inconsistent data or even system crash. It is not trivial to be able to predict these bottlenecks over time.

DESCRIPTION OF THE RELATED ART

Patent application US 2018/0157978 discloses a method to predict performance of database queries by developing a model based on monitoring and applying a knee of curve formula on the model to apply a growth scenario for prediction purposes. Expected change to workload may be used for upgrading the existing system. Future problems are identified in a specific test or development environment.

SUMMARY

An object is to provide a method and apparatus so as to provide an improved query performance prediction method, where at least one of the problems is eliminated or at least alleviated. The objects of the present invention are achieved with a method, system and a computer program product according to the independent claims.

Embodiments of the invention are disclosed in the dependent claims. The term query is commonly used in the DBMS environments to describe any query-based, typically SQL-based, programming language batch, view, stored procedure or such programmatic logic that executes one or more data operations (statements) against the DBMS and/or database (s). Terms query and database query are used in this application interchangeably to represent any such programming language operations.

According to a first aspect, a method is provided, comprising obtaining query performance counter (QPC) data from a database management system via an application programming interface, storing the QPC data, selecting a database query and a QPC and performing a plurality of time series analyses for time series associated with the selected database query and QPC. Each analyzed time series is generated based on said stored QPC data. The plurality of time series represents a plurality of different time dimensions, and wherein each time series analysis is performed by a) selecting a time dimension and a time span, b) forming a time series corresponding to the selected time dimension and covering the time span, wherein the time series comprises data points representing a portion of the stored QPC data that is associated with the selected database query and the selected QPC, c) obtaining at least one threshold for the selected QPC, d) using data points of the time series as basis for generating at least two different candidate trends over the selected time span in the selected time dimension, wherein said candidate trends are generated using mutually different mathematical trend forecasting methods, e) statistically comparing the generated candidate trends to data points of the respective time series to select the candidate trend that fits best with the time series as a selected trend, f) predicting at least one future data point using the selected trend, wherein the at least one future data point is in the selected time dimension, g) comparing the at least one future data point with the at least one threshold, and f) if any of the at least one future data point exceeds one or more of the at least one threshold, triggering an alert. The analysis is repeated for another of the plurality of different time dimensions until all of said plurality of different time dimensions have been analyzed.

According to a second aspect, said obtaining at least one threshold for the selected QCP comprises determining, whether at least one predefined threshold is available for the current time series analysis, and if yes, obtaining the at least one predetermined threshold from a repository and if no, defining at least one threshold and storing the at least one threshold in the repository to make it available for a future time series analysis.

According to a third aspect, the at least one threshold defines a maximum allowed deviation between a future data point predicted on basis of the selected trend and the respective time series used for generating the selected trend.

According to a fourth aspect, the at least one threshold is defined with respect to an individual data point of the time series and/or with respect to a statistical characteristic determined based on a plurality of data points of the respective time series used for generating the selected trend.

According to a fifth aspect, said statistically comparing the generated candidate trends to data points of the respective time series to select the best fitting candidate trend as a selected trend is performed using $R^2$-analysis.

According to a sixth aspect, said time dimension is one of a consecutive time dimension or a parallel time dimension.

According to a seventh aspect, the alert comprises or is associated with information comprising at least one of: type of the selected trend, the time span, time series values over the time span, predicted future data points and $R^2$-analysis.

According to an eighth aspect, the method further comprises j) selecting a query plan out of at least two query plans that have been used for performing the same database query, k) performing steps d), e) and f) for the selected query plan, and l) repeating steps j) and k) for each query plan, until all of the at least two query plans have been provided with a selected trend and at least one predicted future data point. Further, in step m) results of the analysis and prediction between the at least two query plans are compared for determining, which one of the at least two query plans works the best and/or the worst with respect to performance with respect to the currently analyzed QPC in the selected time dimension.

According to another aspect, computer program product comprising computer executable code which, when executed by a computer or a computer system performs steps of any one the above aspects.

According to yet another aspect, a computer readable medium is provided, having stored thereon computer executable code, which, when executed by a computer or a computer system performs steps of any one the above aspects.

According to a yet further aspect, a system is provided comprising an application programming interface for obtaining query performance counter (QPC) data from a database management system, a repository for storing the QPC data and a computer or computer system. The computer or computer system is further configured to perform any of the method steps according to the above aspects.

The great advantage of this method is that it is able to predict hidden query performance bottlenecks long time before they occur and therefore to provide a time window for a Database Administrator (DBA) or another computer program or method to investigate the deviating query performance in order to prevent DBMS slowness, DBMS failures, inconsistent data or even system crash.

Other advantage of this method is that it can identify hidden differences in performances of different query plans used for the same query and to indicate which query plan has the best overall performance and/or to alert which query plan will have the best or worst performance in the selected time dimension, in order to facilitate selecting the query plan that provides best results in terms of speed and performance at the next future occurrence of the selected time dimension, as well as discarding and/or identifying need to improve any identified, poorly performing query plan or plans.

A separately hosted repository is used for storing performance data of any DBMS system(s) by collecting the query performance counters (QPCs) from available performance application programming interfaces (API) such as Dynamic Management Views (DMV), Performance Monitor APIs (PerfMon API) and/or Extended events, which provides an advantage that no extra workload is caused on source DBMS server(s) or service(s) because all the analysis can be performed on this separate repository.

Yet another advantage of this method is that when an anomaly in query performance is detected, when inspecting the overall query performance results over the analyzed time span, it can be seen from the repository data whether there was any other query taking resources, i.e. locking or blocking, consuming CPU resources etc., from that particular query at that given point of time, thus enabling identification of the root cause of the anomaly.

BRIEF DESCRIPTION OF THE DRAWINGS

In the following the invention will be described in greater detail, in connection with preferred embodiments, with reference to the attached drawings, in which.

DETAILED DESCRIPTION

Figure 1:
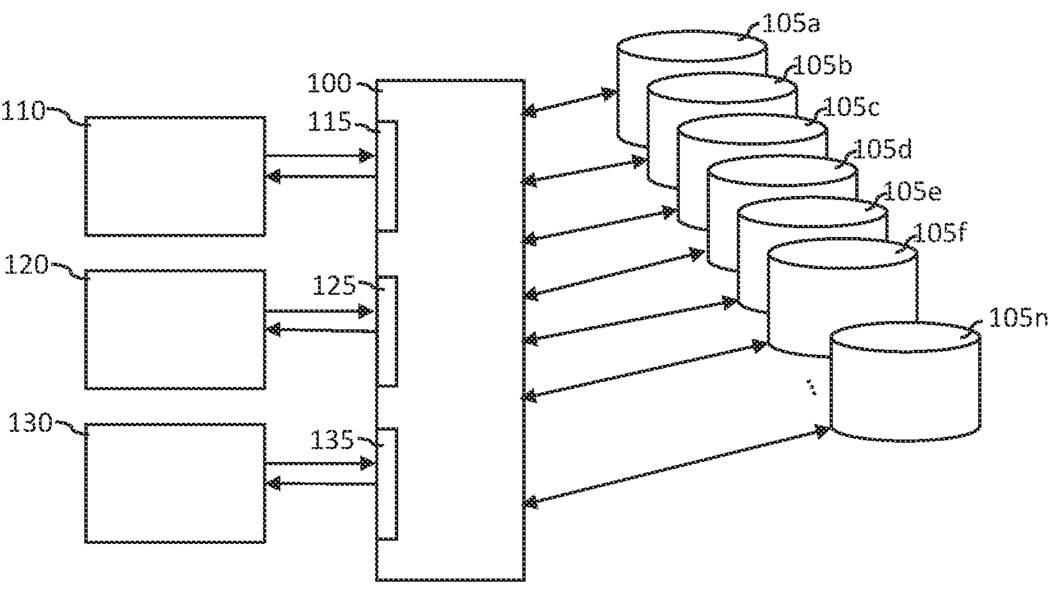
FIG. 1 illustrates main elements of a DBMS system.

The FIG. 1 illustrates schematically an operation environment of a DBMS system. The DBMS (100) manages a plurality of databases (105*a*, 105*b*, 105*c*, . . . 105*n*), which store structured data. The DBMS (100) is provided with one or more application programming interfaces (115, 125, 135) which provide access to the data stored in the databases (105*a* to 105*n*). Data may be stored and queried for example by applications (110) and users (120). An analysis apparatus (130) is provided with an API (135) for obtaining performance time series data is provided between the DBMS (100) and the analysis apparatus (130). Both the DBMS (100) and the analysis apparatus (130) are preferably implemented as physical computers like servers or virtual systems such as cloud services.

The DBMS (100) collects performance data during operation. For enabling analysis and prediction of query performance, DBMS query performance data is preferably stored as a continuous process. Query performance data is preferably stored in form of time series. Because the nature of the DBMS systems requires that any excessive workloads should to be eliminated from the DBMS server and/or service and because analyzing query performance may create high workloads, it is recommended to have a separately hosted service or repository for capturing and/or storing the performance time series data of the DBMS system(s). This functionality is referred to as the analysis apparatus (130).

The analysis apparatus (130) collects the query performance counters (QPCs) using any applicable available performance API such as Dynamic Management Views (DMV), Performance Monitor (PerfMon) API and/or Extended events without causing extra workload on the source DBMS server(s) and/or service(s). Such arrangement allows all analysis and prediction to take place on this dedicated analysis apparatus (130), thus not causing any risk for loading the DBMS server and/or service. The analysis apparatus (130) preferably comprises at least one processor and at least one memory for storing both the time series data and for storing computer program code for performing various tasks related to the data collection, analysis, predicting and alerting.

Figure 2:
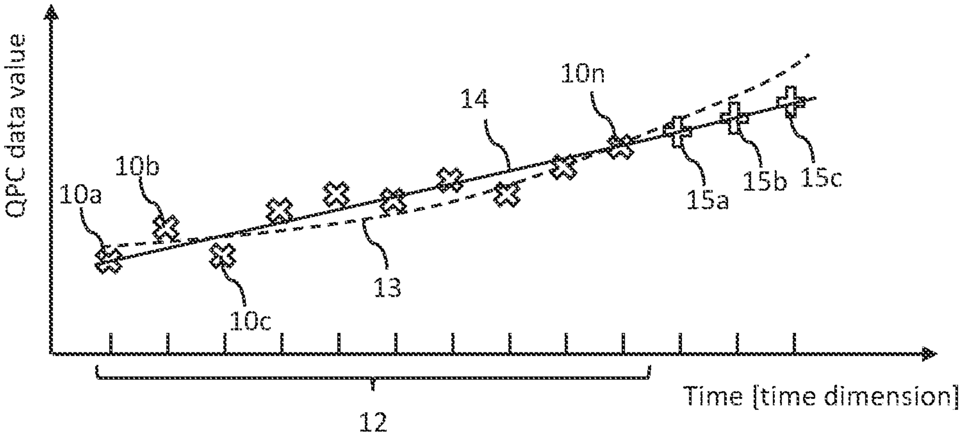
FIG. 2 illustrates schematically a time series, trend and forecasted data.

The FIG. 2 illustrates schematically some terms that are used for describing the invention. A time axis used for each analysis is defined by a selectable time dimension. A time span (12) is selected on the time dimension and QPC data points (10*a*, 10*b*, 10*c*, . . . 10*n*) form a time series that represents measured and stored QPC data values over the selected time span (12) that are used for the analysis. At least two candidate trends (13, 14) are generated based on the time series, and the candidate trends are statistically compared to the actual data points to determine, which candidate trend has best fit with the actual data. The one of the candidate trends that has best fit is selected as a selected trend (14), here marked with a solid line. The exemplary discarded candidate trend (13) is marked with a dashed line. The selected trend (14) is then used for determining at least one future data point (15*a*, 15*b*, 15*c*) that represent(s) the predicted QPC value at respective at least one future point of time that is defined based on the selected time dimension, and occurs after the selected time span (12).

Great majority of database management systems have certain behavioral characteristics in hardware resource usage over time, which characteristics is utilized as one core element of the invention. According to the invention, data points in different time dimensions based on each query performance counter are collected, stored and analyzed, using a "brute force" approach, trend analysis such as linear regression, exponential, logarithmic, polynomial, power, moving average or like, followed by a mathematical method for selecting a best fitting trend type that is then used for analysis and prediction.

Coefficient of determination, denoted $R^2$ and pronounced as R-squared, is one known statistical measure that represents the proportion of the variance for a dependent variable that's explained by an independent variable or variables in a forecast model, and can thus be used as the mathematical method for selecting the best fitting trend. In other words, the $R^2$-analysis determines how close the actual, measured data points are to the trend generated using a forecast model. Value 0% indicates that a trend generated using the selected forecast model explains none of the variability of the response data around its mean, while value 100% indicates that the trend explains all the variability of the measured data around its mean. If a predicted, future value obtained using the best fitting trend of QPC values deviates enough from an acceptable range of values, an alert is triggered. Preferably, triggering the alert requires that the predicted data point in the best fitting, selected trendline exceeds the acceptable value range of the predicted query performance counter (QPC). Evaluation of whether the predicted data point exceeds the acceptable value range is preferably based on a trend that has high $R^2$, and optionally based on a supplementary residual analysis to exclude possible bias in the used forecast model. A high $R^2$ refers for example to $R^2$ value that is 60% or more, which indicates that the selected trend obtained using the selected forecast method is relatively accurate.

The acceptable range of predicted data point values can be based on best practices or a statistical measure obtained based on measurement history of the respective QPC on selected time dimension. Acceptable range of values may be for example average value of the respective measured QPC values with maximum allowed deviation over a period of time. The system is also capable of learning from the predicted and actualized values how well a generated trend fits the actual data for certain QPC time dimension and based on the learned goodness of fit, the system is able to define accuracy of the prediction even in long term.

The goodness of fit is calculated similarly to the residuals, by defining the actualized QPC values' $R^2$ distance (intrinsic value) from the predicted values.

In this calculation, a value of 0 is ideal and more it deviates from the 0 the worse the model is. Also, by putting the $R^2$ distance values of the same prediction at different times on a gaussian scale it can be seen how well the model behaves in general. By adding up a linear trendline for the variable calculation, it can be determined whether the model becomes more accurate or inaccurate over time. This principle is illustrated in the FIG. 3.

Figure 3:
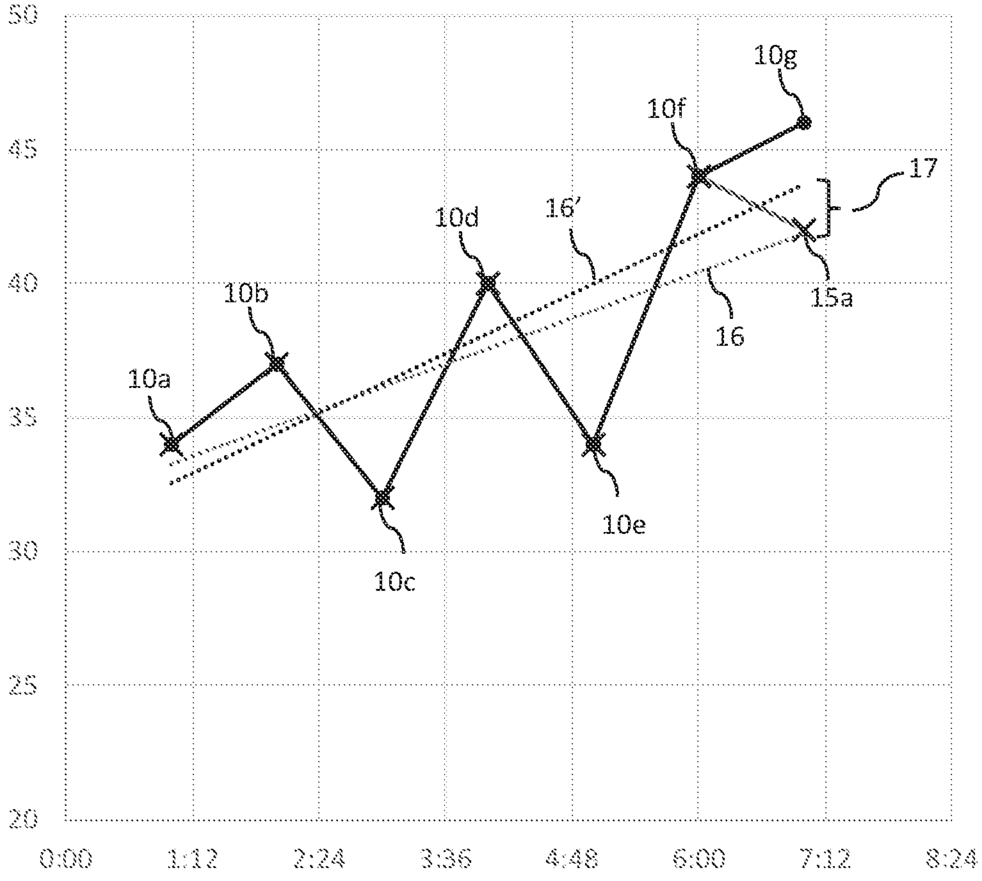
FIG. 3 illustrates calculations for determining accuracy of the prediction.

FIG. 3 illustrates actual data points (10*a*, 10*b*, . . . 10*f*) over a time span. A forecast is performed that is used to determine a predicted performance data point 15*a* for a future point of time. An predicted $R^2$ (16), which can be noted as the $R^{2P}$, is calculated for the time series that includes the actual data points (10*a* to 10*f*) and the predicted data point (15*a*). After a while, the predicted query is performed, and the actualized data point (10*g*) is obtained. A new $R^2$ (16'), which can be noted as the $R^{2A}$, is calculated using all data points over all actualized data points (10*a*, . . . 10*g*). Goodness of the prediction is determined by calculating difference between the predicted $R^2$ and the actualized $R^2$ for example by calculating difference D using equation:

$$D=(R^{2A}/100)*|(R^{2A}-R^{2P})|,$$

Difference D thus indicates percentual difference between the predicted $R^2$ and the actualized $R^2$.

For predicting accuracy of the prediction in long term, a threshold T is preferably defined for predicted $R^2$ in order to accept a trend as a selected trend. Development of the accuracy in comparison to the actualized values can be followed as a function of time by storing differences D obtained for the same prediction at different times as a time series. An optimal minimum for the threshold value T for the predicted $R^2$ can be found that provides sufficient accuracy for the prediction. Accuracy achieved with the threshold value T is determined based on determined differences D. The threshold value T can be adjusted accordingly. Changes in the accuracy of the prediction over time can also be followed. Deviation values D obtained at different times can be also plotted on a gauss curve to determine statistical distribution of the deviation.

Based on this, the analysis and forecast model can be further trained by optimizing the alert threshold of the $R^2$ in between the 0% and 100% for actual prediction to fulfill the desired level of confidence in the prediction model itself. An exemplary alternative to $R^2$ is for example a comparison with norm of residuals, values of which vary from 0 to infinity, with smaller numbers indicating a better fit. Another possible alternative is the root-mean-square deviation (RMSD), which is, however, sensitive to outliers.

Applicable QPCs and their typical units comprise:

Duration [ms]

Central Processing Unit (CPU) Time [ms]

Logical Reads [data pages]

Logical Writes [data pages]

Physical Reads [data pages]

Common Language Runtime (CLR) time [ms]

Declaration of Performance (DOP)

Memory Consumption [KB]

Row Count

Log Memory Used [KB]

Temp DB Memory Used [KB]

Wait Time [ms]

In addition to these typical query performance counters (QPCs), any other essential query behavior such as locking and/or blocking can be traced.

Most relevant time dimensions can be divided into two main categories, which are here referred to as consecutive and parallel time dimensions.

A consecutive time dimension represents a plurality of consecutive time periods. A non-limiting list of exemplary consecutive time dimensions comprise:

- consecutive weekdays: Monday, Tuesday, Wednesday, Thursday, Friday, Saturday, Sunday . . .
- consecutive weeks: First week of 2020, Second week of 2020, Third week of 2020, Fourth week of 2020 . . .
- consecutive months: 2020-January, 2020-February, 2020-March, 2020-April, 2020-May . . .
- consecutive hours of a given day, possibly constrained by a service time slice: Jan. 1 2020 at 05:00:00, 06:00:00, 07:00:00, 08:00:00 . . .
- consecutive minutes of given hour: 01:00:00, 01:01:00, 01:02:00, 01:03:00, 01:04:00 . . .

A parallel time dimension refers to time periods that are further away from each other than the length of the respective time period. A non-limiting list of exemplary parallel time dimensions comprises:

- same weekday of consecutive weeks: first Monday of 2020, second Monday of 2020, third Monday of 2020, fourth Monday of 2020 . . .
- same hours of consecutive days: 2020 Jan. 1 at 01:00, 2020 Jan. 2 at 01:00, 2020 Jan. 3 at 01:00, 2020 Jan. 4 at 01:00 . . .
- last days of consecutive months: 2020 Jan. 31, 2020 Feb. 29, 2020 Mar. 31, 2020 Apr. 30 . . .
- first days of consecutive months: 2020 Jan. 1, 2020 Feb. 1, 2020 Mar. 1, 2020 Apr. 1 . . .
- same weekly members of consecutive years: First week of 2020, First week of 2021, First week of 2022, First week of 2023 . . .
- same month of consecutive years: January 2020, January 2021, January 2022, January 2023
- same month and day of consecutive years: Jan. 5 2020, Jan. 5 2021, Jan. 5 2022, Jan. 5 2022 . . .
- same hour of given weekday of consecutive weeks: Jan. 1 2020 at 07:00:00, Jan. 8 2020 at 07:00:00, Jan. 15 2020 at 07:00:00 . . .
- last day of given month of consecutive years: Feb. 29 2020, Feb. 28 2021, Feb. 28 2022, Feb. 28 2023 . . .
- first day of given month of consecutive years: Feb. 1 2020, Feb. 1 2021, Feb. 1 2022, Feb. 1 2023 . . .
- specific annual holiday of consecutive years: Christmas day 2020, Christmas day 2021, Christmas day 2022, Christmas day 2023 . . .

A time span represents a selected range of times on the respective time dimension. For example, when the time dimension is consecutive hours of a day, time span may be one specific day, specific hours of the day, or a few days.

Each query constitutes its own calculation for each query performance counter and time dimension with desired time span, defining a number of data points in the respective time series. All the individual data points comprise the respective query performance counter value and the query plan as metadata. This data is stored in the repository of the analysis apparatus over time.

A trend that enables forecasting next value in a time series can be calculated from any number {2 . . . n} of data points in an actualized time series. Typically, the more data points the better forecast. For enabling alerting for example due to a possible future problem, at least one threshold for each query performance counter needs to be defined. The threshold may determine how much a value in the trend obtained using a selected trend forecasting method can deviate from actualized time series values without triggering an alert. A threshold can be based on mathematical statistics of the QPC values, such as an average of average QPC values and maximum QPC values over a certain time period in the relevant time dimension, depending on the system baselines, wherein the threshold is defined for each query and/or, when the analysis is made on query plan level optionally for each query plan, so that query plans can be distinguished from each other and each query made using a specific query plan is to be analyzed instead of just analyzing the individual query. As understood by the skilled person, there is a multitude of possibilities to apply different mathematical methods of calculating the threshold for the analysis and it is not relevant to go through all of them in this context.

Trends of QPC time series can be analyzed and prediction can be performed individually on database-, instance-, server- and/or any other abstraction level.

In this context, "brute forcing" refers to performing the analysis and prediction for all the possible combinations of each query and optionally each query plan, for each query performance counter (QPC) and for each time dimension for each possible time span over the whole data population.

In the following, the invention is described with simple examples.

Figure 4:
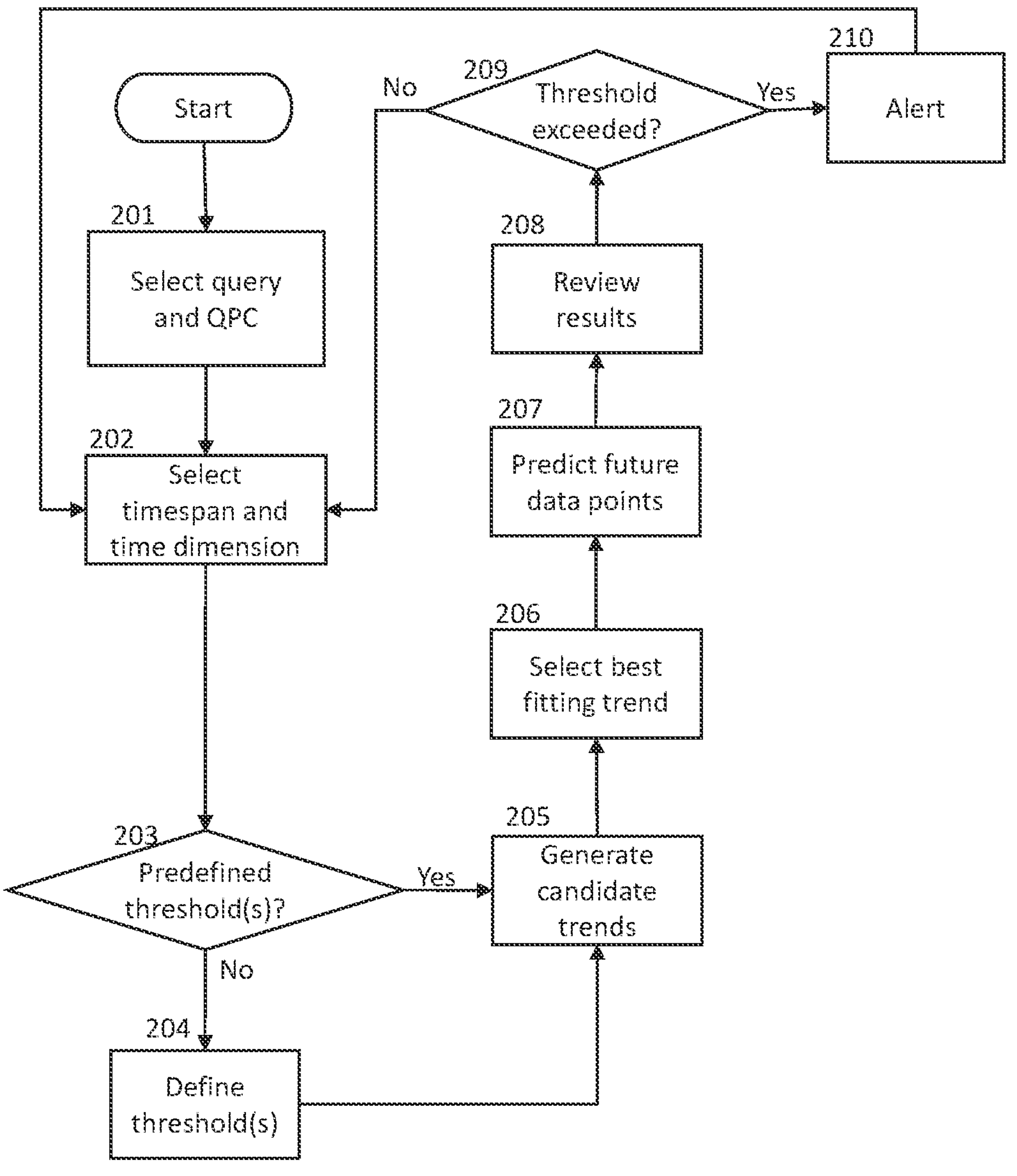
FIG. 4 is a flow chart illustrating steps of a method of making an analysis and prediction on a query level

The FIG. 4 illustrates steps of a method of making an analysis on a query level.

In the step 201, a database query is selected for analyzing its performance with respect to a selected query performance counter (QPC). The selected QPC can be any applicable query performance counter on which performance data points have been obtained via the respective API from the DBMS and are thus available for use by the analysis apparatus.

Several consecutive and/or parallel time dimensions are preferably selected that will be analyzed for the selected database query with respect to the selected QPC, and in the step 202, one of the time dimensions is selected at a time for analysis. The method will be repeated as many times as needed, to execute the analysis for all selected time dimensions.

In the step 203, it is determined whether the analysis to be made already has predefined threshold or thresholds available, for example because similar analysis has been performed before for a different time span, or whether the analysis has no predefined threshold or thresholds because the analysis appears to be new. If the analysis is new, at least one threshold value is defined in the step 204 for the current analysis that will be used as criteria during the later phases of the analysis for determining whether an alert should be triggered. If the analysis has been performed earlier, the at least one related threshold value has already been defined earlier and stored in the analysis apparatus, and thus readily available; in such case, step 204 may be omitted and the process may proceed directly to the step 205.

In the step 205 at least one, preferably more than one trend forecasting method is selected, and data points concerning the selected QPC and the currently selected time dimension are applied using each of the selected trend forecasting methods to generate candidate trends.

In the step 206, the candidate trend that has best fit with the current actual time series data is selected. Selection can be performed by comparing candidate trends provided by each of the trend forecasting methods to the actual data points in the respective time series using a suitable mathematical method, such as $R^2$-analysis.

In the step 207, at least one future data point is predicted using the selected trend. The future data point represents a predicted value of the respective QPC at a point of time in the selected time dimension.

In the step 208, predicted data point or points obtained using the selected, best fitting trend is/are reviewed against the threshold.

In the step 209, it is decided whether the result of review in step 208 indicates that a predicted future data point in the selected trend exceeds one or more of the at least one threshold that was obtained in the step 203 or 204. If a threshold is exceeded, an alert is triggered in the step 210. If no threshold is exceeded, no alert is triggered.

A predicted data point in the time series exceeding the threshold may indicate a hidden anomaly, that only had a minor, possibly unnoticeable effect in the past performance, but which may in future occur again with more severe effects. The prediction enables recognizing such hidden anomaly, and may thus give an early prediction of more severe problems in future. By detecting such anomaly early on, the matter can be investigated early on and appearance of future problems can be avoided. Sensitivity of the analysis is set by the one or more thresholds.

The process then returns to the step 202, and the same analysis process is repeated for another of the selected time dimensions and optionally for another time span, until all selected time dimensions have been analyzed.

This generic process can further be illustrated by a first practical, non-limiting example. In this first example, a query A) is executed randomly multiple times on each given hour of each day, every day of the year. Let's assume that the query A) is run in between Jan. 1 2018 and Dec. 31 2020 continuously with same query plan and one of the selected time dimensions is to analyze consecutive weekdays. Calculating process goes as follows:

In the step 201, query A) and query performance counter "worker time" is selected. Selected analysis time dimension in the step 202 is: "Consecutive weekdays". A time span is selected for the analysis, in this case let the time span be the previous 7 days, which is: {2020 Dec. 25, 2020 Dec. 26, 2020 Dec. 27, 2020 Dec. 28, 2020 Dec. 29, 2020 Dec. 30, 2020 Dec. 31}. If there are already predefined threshold(s) stored for this specific analysis, based on like analysis that has been performed before, possibly using an earlier occurred, but otherwise corresponding time span, the predefined threshold(s) are preferably used. If the analysis has not been performed before, at least one threshold is defined in the step 204 that must not be exceeded. For the analysis, candidate trend forecasting methods are selected and candidate trends are generated using the selected candidate forecasting methods in the step 205, for example: linear regression, polynomial and exponential. In the step 206, all selected trend forecasting methods are tested, by generating a respective candidate trend and using for example $R^2$ analysis or equivalent, which trend fits best with the actual QPC data. In this case, linear regression is found to give a trend that fits best with the actual time series data points. Thus, the trend generated using linear regression is defined as the selected trend. In the phase 207, the selected trend is used to predict at least one future data point, for example data points representing few first days of January 2021. Result of the analysis comprises at least one or more predicted, future QPC values, generated on basis of the selected trend. An alert is triggered by steps 209 and 210 if a predicted future data point that was obtained using the selected trend, exceeds any one of the defined thresholds. The model thus enables predicting a potential future problem of the selected QPC of the selected query before it occurs. Such problem may be caused for example due to a hidden anomaly in the system, which is revealed by the prediction made based on the time series analysis of past data, although it may not be clearly visible in the actual obtained time series. The alert may comprise or be associated with information such as type of the best fitting trend, actual time span with actualized time series data point values and R-squared analysis. Type of the trend refers to the forecasting method used for generating the selected trend that was found to have best fit with the actual data.

Figure 5:
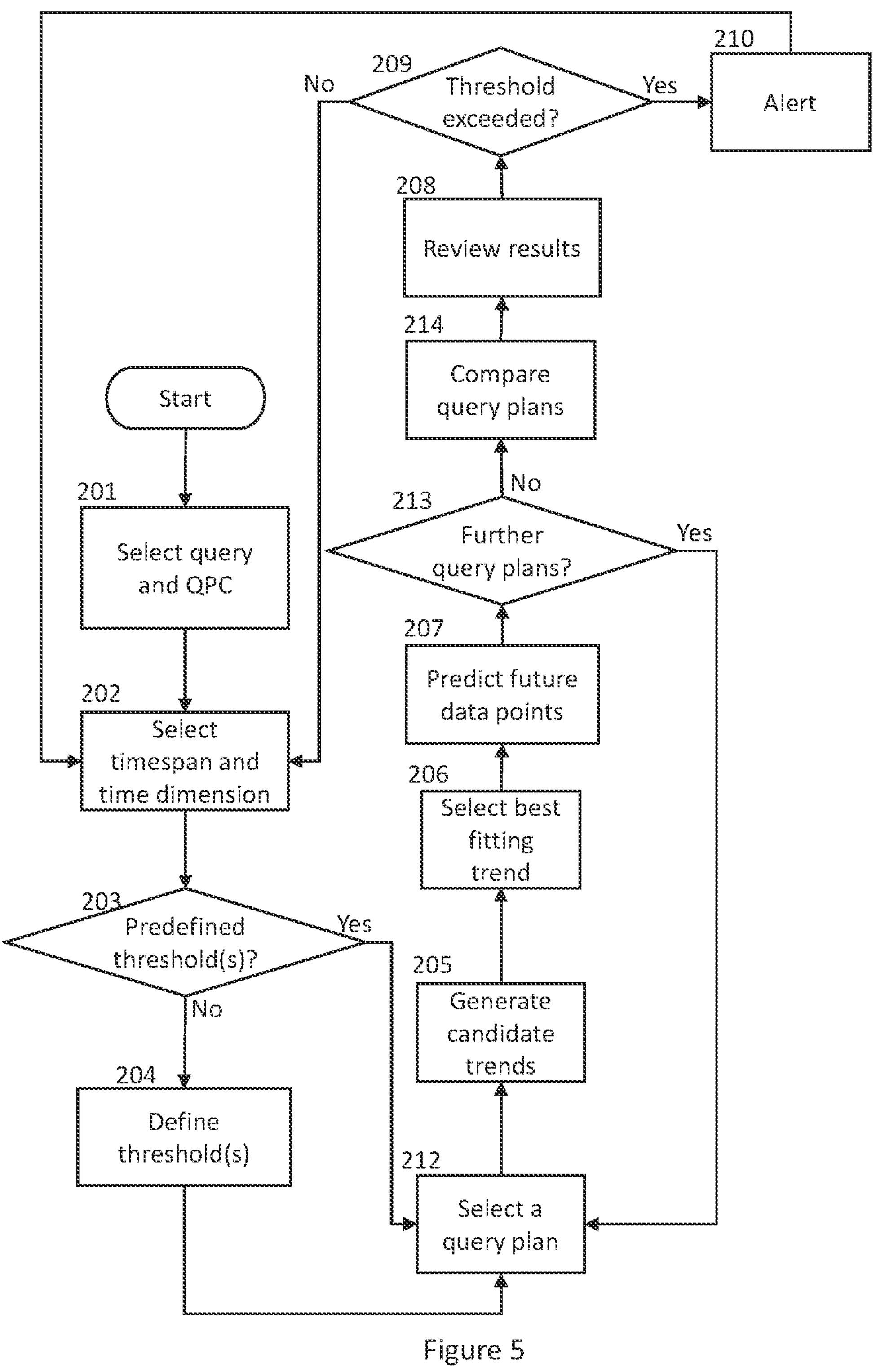
FIG. 5 is a flow chart illustrating steps of a method of making an analysis and prediction on a query plan level.

The FIG. 5 illustrates steps of a method of making a time series analysis and prediction on a query plan level. The method uses similar steps with the method of FIG. 4 but adds another iteration loop for covering all applicable query plans. Thus, after defining in the step 203, whether there are already predefined threshold(s) available for the analysis, and optionally defining at least one applicable threshold in the step 204 or finding out in the step 203, that the analysis for this time dimension is not new and that there is already at least one threshold set and stored for this analysis, and deciding to use the pre-existing threshold(s), a query plan is selected in the step 212 among the applicable query plans for this query, and the analysis is performed using QPC data time series that have been obtained while the selected query plan was used to perform the query.

At least two different trend forecasting methods are selected for the selected query plan and used to generate candidate trends in the step 205. The best fitting trend among the candidate trends is then selected in the step 206 to be used as the selected.

In the step 207, future data points are predicted for the current query plan using the respective selected trend.

In the step 213 it is checked, whether there are any further, non-analyzed query plans, and if yes, another query plan is selected for analysis to find the best fitting, selected trend to be used for the respective query plan, until all applicable query plans for the selected query have been handled.

Steps 207 and 213 may also be performed in a different order; future data points may be predicted for each query plan only after best fitting trends for each query plan have been selected first.

In the step 214, results of the analysis received for different query plans are compared with each other to determine, which of the query plans are fastest/slowest in this time dimension, or perform best/worst with respect to the measured and analyzed QPCs in this time dimension. This information can be used for example for selecting the preferred query plan, which may depend on the planned time of performing the next respective query. In query plan performance comparison, past performances of the query plans and/or predicted future performance of the query plans can be used, while predicted performance is preferably used as selection criterion.

Steps 208, 209 and 210 are the same as already described above in relation to the FIG. 2. Review of results of the analysis and prediction may be reviewed for all query plans, or for example the best and/or the worst performing query plan(s) only.

This generic process can further be illustrated by a second practical, non-limiting example. In this first example, a query B) is executed randomly multiple times on each given hour of each day, every day of the year. Let's assume that query has been run continuously between Jan. 1, 2018 and Dec. 31, 2020 with either one of two available query plans over time and one of selected time series analysis time dimensions is "same weekday of consecutive weeks". Calculating any predictive alert goes as follows:

In the step 201, query B) and query performance counter "calendar time" is selected. In the step 202, analysis is performed in a parallel time dimension: "same weekday of consecutive weeks" is selected, and a time span is selected for the analysis for each query plan. For example, the time span may be Mondays of last 7 weeks, which is: {2020 Nov. 16, 2020 Nov. 23, 2020 Nov. 30, 2020 Dec. 7, 2020 Dec. 14, 2020 Dec. 21, 2020 Dec. 28}. Preferably, the same time span is used for each query plan so that the results are comparable. If the time series for any query plan is not sufficiently uniform when analyzed for example on hourly basis, data points are preferably aggregated so that all queries run using a particular query plan at any time during a day are represented by an aggregated data point, which provides an adequate statistical performance estimate. As known in the art, a typical DBMS environment, selection of any particular one of the possible query plans is typically a stochastic process. In the step 203, it is checked whether there are predefined threshold(s) available, and if not at least one threshold is defined in the step 204. Otherwise, at least one pre-existing threshold will be used in the analysis. If it is found out that the matrix of data points has sufficient coverage only for a single query plan, insufficient data series and comparison between different queries may be discarded.

Preferably, a plurality of trend forecasting methods are selected in the step 205, that will used for generating candidate trends for each query plan. Selected trend forecasting methods in this example are linear regression, moving average and exponential. All selected trend forecasting methods are applied to generate candidate trends in the step 205, which are subsequently tested in the step 206 using for example R-squared analysis or equivalent, to find the best fitting trend. In this case linear regression is found to provide a trend that fits best with the actual time series data points.

In the step 213, it is checked whether all applicable query plans for this query have already been handled, and if not, another query plan is picked up for analysis, candidate trend generation and trend selection.

In the step 207, future data points are predicted for the currently analyzed query plan.

In the step 214, results for each query plan are compared to each other, to define which one of the analyzed query plans performs the best and/or the worst with respect to the used QPC. Step 207 may alternatively be performed only after step 213 so that best fitting trend is first selected for each query plan and future data point prediction is performed for each respective query plan only after all selected trends have been defined. In the step 208, results for each query plan are reviewed as already explained above in relation to the FIG. 4, and if a threshold value is exceeded by a predicted data point of any of the query plans, an alert is triggered by steps 209 and 210. The alert may comprise or be associated with information such as the type of the forecast method used for generating the best fitting trend, actual time span with actualized time series values and $R^2$-analysis for each analyzed query plan.

The process then returns to step 202, in which a new time dimension is selected for the same query and QPC until for selecting another time dimension to be analyzed.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A method comprising:

obtaining query performance counter (QPC) data from a database management system via an application programming interface;

storing the QPC data;

selecting a database query and a QPC;

performing a brute force analysis comprising a plurality of time series analyses for a plurality of different time series associated with the selected database query and QPC, wherein each analyzed time series is generated based on the stored QPC data, and wherein the plurality of time series represents a plurality of different parallel time dimensions, wherein a parallel time dimension comprises a plurality of time periods of determined length that are further away from each other than the length of the respective time periods of determined length, wherein the QPC data stored during the plurality of time periods of determined length is used for the analysis, wherein the time period of determined length is any one of a minute, an hour, a day, a week and a month, and wherein the time series analysis comprises:

a) selecting a time dimension and a time span;

b) forming a time series corresponding to the selected time dimension and covering the time span, wherein the time series comprises data points representing a portion of the stored QPC data that is associated with the selected database query and the selected QPC;

c) obtaining at least one threshold for the selected QPC;

d) using data points of the time series as basis for generating at least two different candidate trends over the selected time span in the selected time dimension, wherein the at least two different candidate trends are generated using mutually different mathematical trend forecasting methods;

e) statistically comparing the generated candidate trends to data points of the respective time series to select the candidate trend that fits best with the time series as a selected trend;

f) predicting at least one future data point using the selected trend, wherein the at least one future data point is in the selected time dimension;

g) comparing the at least one future data point with the at least one threshold;

h) if any of the at least one future data point exceeds one or more of the at least one threshold, triggering an alert; and i) repeating the analysis for another of the plurality of different time dimensions until all of the plurality of different time dimensions have been analyzed.

2. The method according to claim 1, wherein the obtaining at least one threshold for the selected QCP comprises determining, whether at least one predefined threshold is available for the current time series analysis, and if yes, obtaining the at least one predetermined threshold from a repository, and if no, defining at least one threshold and storing the at least one threshold in the repository to make it available for a future time series analysis.

3. The method according to claim 1, wherein the at least one threshold defines a maximum allowed deviation between a future data point predicted on basis of the selected trend and the respective time series used for generating the selected trend.

4. The method according to claim 3, wherein the at least one threshold is defined with respect to an individual data point of the time series and/or with respect to a statistical characteristic determined based on a plurality of data points of the respective time series used for generating the selected trend.

5. The method according to claim 1, wherein the statistically comparing the generated candidate trends to data points of the respective time series to select the best fitting candidate trend as a selected trend is performed using $R^2$-analysis.

6. The method according to claim 1, wherein the alert comprises or is associated with information comprising at least one of: type of the selected trend, the time span, time series values over the time span, predicted future data points and $R^2$-analysis.

7. The method according to claim 1, wherein the method further comprises:

j) selecting a query plan out of at least two query plans that have been used for performing the same database query, k) performing steps d), e) and f) for the selected query plan, and l) repeating steps j) and k) for each query plan, until all of the at least two query plans have been provided with a selected trend and at least one predicted future data point, and m) comparing results of the analysis and prediction between the at least two query plans for determining, which one of the at least two query plans works the best and/or the worst with respect to performance with respect to the currently analyzed QPC in the selected time dimension.

8. The method according to claim 1, wherein the time span includes a total duration of the plurality of time series analyses.

9. A non-transitory computer readable medium having stored thereon computer executable code which, when executed by a computer or a computer system, causes the computer or computer system:

to obtain query performance counter (QPC) data from a database management system via an application programming interface;

to store the QPC data;

to select a database query and a QPC;

to perform a brute force analysis, the brute force analysis comprising a plurality of time series analyses for a plurality of different time series associated with the selected database query and QPC, wherein each analyzed time series is generated based on the stored QPC data, and wherein the plurality of time series represents a plurality of different parallel time dimensions, wherein a parallel time dimension comprises a plurality of time periods of determined length that are further away from each other than the length of the respective time periods of determined length, wherein the QPC data stored during the plurality of time periods of determined length is used for the analysis, wherein the plurality of time periods of determined length are durations of the time series analyses, wherein the time period of determined length is any one of a minute, an hour, a day, a week and a month, and wherein the time series analysis comprises:

a) selecting a time dimension and a time span;

b) forming a time series corresponding to the selected time dimension and covering the time span, wherein the time series comprises data points representing a portion of the stored QPC data that is associated with the selected database query and the selected QPC;

c) obtaining at least one threshold for the selected QPC;

d) using data points of the time series as basis for generating at least two different candidate trends over the selected time span in the selected time dimension, wherein the at least two different candidate trends are generated using mutually different mathematical trend forecasting methods;

e) statistically comparing the generated candidate trends to data points of the respective time series to select the candidate trend that fits best with the time series as a selected trend;

f) predicting at least one future data point using the selected trend, wherein the at least one future data point is in the selected time dimension;

g) comparing the at least one future data point with the at least one threshold;

h) if any of the at least one future data point exceeds one or more of the at least one threshold, triggering an alert; and i) repeating the analysis for another of the plurality of different time dimensions until all of the plurality of different time dimensions have been analyzed.

10. The non-transitory computer readable medium according to claim 9, wherein the time series analysis comprising obtaining at least one threshold for the selected QPC includes determining, whether at least one predefined threshold is available for the current time series analysis, and if yes, obtaining the at least one predetermined threshold from a repository, and if no, defining at least one threshold and storing the at least one threshold in the repository to make it available for a future time series analysis.

11. The non-transitory computer readable medium according to claim 9, wherein the at least one threshold defines a maximum allowed deviation between a future data point predicted on basis of the selected trend and the respective time series used for generating the selected trend.

12. The non-transitory computer readable medium according to claim 9, wherein the time series analysis comprising statistically comparing the generated candidate trends to data points of the respective time series to select the best fitting candidate trend as a selected trend is performed using $R^2$-analysis.

13. The non-transitory computer readable medium according to claim 9, wherein the alert comprises or is associated with information comprising at least one of: type of the selected trend, the time span, time series values over the time span, predicted future data points, and $R^2$-analysis.

14. The non-transitory computer readable medium according to claim 9, wherein the time series analysis further comprises:

j) selecting a query plan out of at least two query plans that have been used for performing the same database query, k) performing steps d), e) and f) for the selected query plan, and l) repeating steps j) and k) for each query plan, until all of the at least two query plans have been provided with a selected trend and at least one predicted future data point, and m) comparing results of the analysis and prediction between the at least two query plans for determining, which one of the at least two query plans works the best and/or the worst with respect to performance with respect to the currently analyzed QPC in the selected time dimension.

15. A system comprising:

an application programming interface for obtaining query performance counter (QPC) data from a database management system;

a repository for storing the QPC data; and a computer or computer system configured to obtain query performance counter (QPC) data from a database management system via an application programming interface;

to store the QPC data;

to select a database query and a QPC; and to perform a brute force analysis comprising a plurality of time series analyses for a plurality of different time series associated with the selected database query and QPC, wherein each analyzed time series is generated based on the stored QPC data, and wherein the plurality of different time series represents a plurality of different parallel time dimensions, wherein a parallel time dimension comprises a plurality of time periods of determined length that are further away from each other than the length of the respective time periods of determined length, wherein the plurality of time periods of determined length are durations of the timeseries analyses, wherein the time period of determined length is any one of a minute, an hour, a day, a week and a month, and wherein the time series analysis comprises:

a) selecting a time dimension and a time span;

b) forming a time series corresponding to the selected time dimension and covering the time span, wherein the time series comprises data points representing a portion of the stored QPC data that is associated with the selected database query and the selected QPC;

c) obtaining at least one threshold for the selected QPC;

d) using data points of the time series as basis for generating at least two different candidate trends over the selected time span in the selected time dimension, wherein the at least two different candidate trends are generated using mutually different mathematical trend forecasting methods;

e) statistically comparing the generated candidate trends to data points of the respective time series to select the candidate trend that fits best with the time series as a selected trend;

f) predicting at least one future data point using the selected trend, wherein the at least one future data point is in the selected time dimension;

g) comparing the at least one future data point with the at least one threshold;

h) if any of the at least one future data point exceeds one or more of the at least one threshold, triggering an alert; and i) repeating the analysis for another of the plurality of different time dimensions until all of the plurality of different time dimensions have been analyzed.

16. The system according to claim 15, wherein the time series analysis comprising obtaining at least one threshold for the selected QPC includes determining, whether at least one predefined threshold is available for the current time series analysis, and if yes, obtaining the at least one predetermined threshold from a repository, and if no, defining at least one threshold and storing the at least one threshold in the repository to make it available for a future time series analysis.

17. The system according to claim 15, wherein the at least one threshold defines a maximum allowed deviation between a future data point predicted on basis of the selected trend and the respective time series used for generating the selected trend.

18. The system according to claim 15, wherein the time series analysis comprising statistically comparing the generated candidate trends to data points of the respective time series to select the best fitting candidate trend as a selected trend is performed using $R^2$-analysis.

19. The system according to claim 15, wherein the alert comprises or is associated with information comprising at least one of: type of the selected trend, the time span, time series values over the time span, predicted future data points, and $R^2$-analysis.

20. The system according to claim 15, wherein the time series analysis further comprises:

j) selecting a query plan out of at least two query plans that have been used for performing the same database query, k) performing steps d), e) and f) for the selected query plan, and l) repeating steps j) and k) for each query plan, until all of the at least two query plans have been provided with a selected trend and at least one predicted future data point, and m) comparing results of the analysis and prediction between the at least two query plans for determining, which one of the at least two query plans works the best and/or the worst with respect to performance with respect to the currently analyzed QPC in the selected time dimension.

* * * * *